United States Patent
Schatzberg et al.

(10) Patent No.: US 9,874,636 B2
(45) Date of Patent: Jan. 23, 2018

(54) DEVICE, SYSTEM AND METHOD OF ORIENTATION ESTIMATION OF A MOBILE DEVICE

(75) Inventors: Uri Schatzberg, Kiryat Ono (IL); Yuval Amizur, Kfar-Saba (IL); Leor Banin, Petach Tikva (IL)

(73) Assignee: INTEL CORPORATION, Santa Clara, CA (US)

( * ) Notice: Subject to any disclaimer, the term of this patent is extended or adjusted under 35 U.S.C. 154(b) by 332 days.

(21) Appl. No.: 13/976,490

(22) PCT Filed: Jun. 8, 2012

(86) PCT No.: PCT/US2012/041602
§ 371 (c)(1),
(2), (4) Date: Jun. 27, 2013

(87) PCT Pub. No.: WO2013/184131
PCT Pub. Date: Dec. 12, 2013

(65) Prior Publication Data
US 2013/0329041 A1  Dec. 12, 2013

(51) Int. Cl.
| G01S 19/03 | (2010.01) |
| G01S 17/06 | (2006.01) |
| G01S 17/02 | (2006.01) |
| H04W 4/02 | (2009.01) |
| G06T 7/73 | (2017.01) |
| G01S 17/89 | (2006.01) |

(52) U.S. Cl.
CPC ............ *G01S 17/06* (2013.01); *G01S 17/023* (2013.01); *G06T 7/74* (2017.01); *H04W 4/026* (2013.01); *G01S 17/89* (2013.01); *G06T 2207/10016* (2013.01); *G06T 2207/30244* (2013.01)

(58) Field of Classification Search
CPC ...................................................... G01S 17/06
See application file for complete search history.

(56) References Cited

U.S. PATENT DOCUMENTS

| 6,625,299 B1 * | 9/2003 | Meisner .................... G01S 5/16 348/169 |
| 2003/0053714 A1 * | 3/2003 | Esaki ................... G06K 9/4604 382/287 |

(Continued)

FOREIGN PATENT DOCUMENTS

| KR | 20010074220 | 8/2001 |
| KR | 20120001276 | 1/2012 |

OTHER PUBLICATIONS

International Preliminary Report on Patentability and Written Opinion for International Patent Application No. PCT/US2012/041602, dated Dec. 18, 2014, 5 pages.

(Continued)

*Primary Examiner* — Jamie Atala
*Assistant Examiner* — Hesham Abouzahra
(74) *Attorney, Agent, or Firm* — Shichrur & Co.

(57) ABSTRACT

Some demonstrative embodiments include devices, systems and/or methods of orientation estimation of a mobile device. For example, a mobile device may include an orientation estimator to detect a pattern in at least one image captured by the mobile device, and based on one or more geometric elements of the detected pattern, to determine one or more orientation parameters related to an orientation of the mobile device.

23 Claims, 5 Drawing Sheets

(56) References Cited

U.S. PATENT DOCUMENTS

| | | | | |
|---|---|---|---|---|
| 2008/0292131 | A1* | 11/2008 | Takemoto | G06T 7/80 382/100 |
| 2010/0007603 | A1 | 1/2010 | Kirkup | |
| 2010/0260426 | A1 | 10/2010 | Huang et al. | |
| 2010/0283872 | A1* | 11/2010 | Chan | G06T 1/00 348/241 |
| 2011/0164114 | A1* | 7/2011 | Kobayashi | H04N 13/0253 348/46 |
| 2011/0304694 | A1 | 12/2011 | Nestares et al. | |
| 2012/0166137 | A1* | 6/2012 | Grasser | G01C 15/00 702/150 |

OTHER PUBLICATIONS

International Search Report for PCT/US2012/041602, dated Mar. 13, 2013.
Office Action for U.S. Appl. No. 15/088,153, dated Jun. 29, 2017, 25 pages.

* cited by examiner

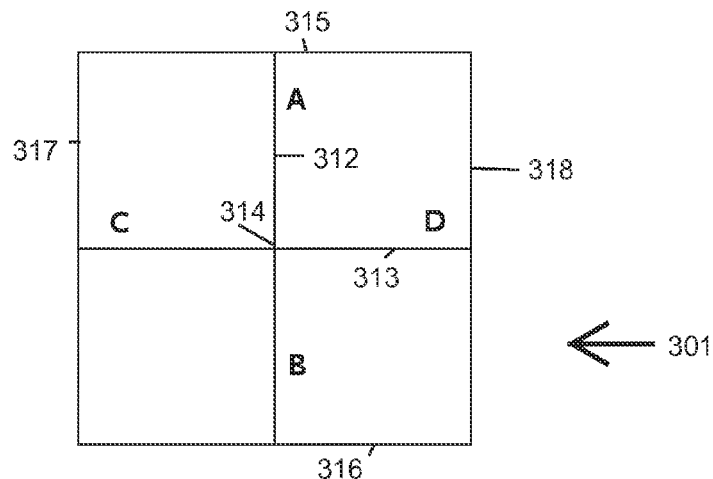
Fig. 3A
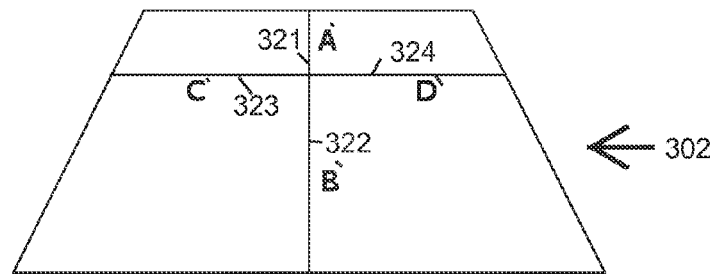
Fig. 3B
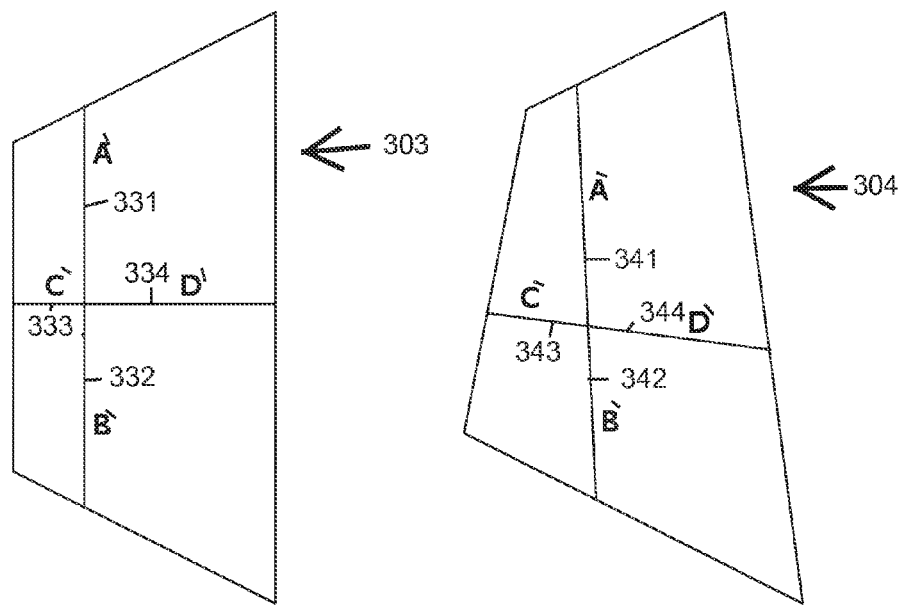
Fig. 3C
Fig. 3D

DEVICE, SYSTEM AND METHOD OF ORIENTATION ESTIMATION OF A MOBILE DEVICE

CROSS REFERENCE

This application is a National Phase Application of PCT International Application No. PCT/US2012/041602, International Filing Date Jun. 08, 2012, the entire disclosure of which is incorporated herein by reference.

BACKGROUND

A mobile device may determine a location of the mobile device using various methods. For example, the mobile device may include a Global Positioning System (GPS) receiver to receive GPS signals from one or more GPS satellites, and to calculate the location of the mobile device based on the GPS signals.

In various occasions, the mobile device may not be able to receive the GPS signals, for example, when the GPS signals are weak, e.g., when the device is located at an indoor location, e.g., a building and the like. As a result, the mobile device may not be able to determine the location of the mobile device.

Some mobile devices may utilize an inertial navigation system to determine the location of the device, e.g., when the device is not able to receive the GPS signals, or to accurately determine the location of the device based on the GPS signals.

The inertial navigation system may include one or more inertial navigation sensors configured to provide position, velocity and/or acceleration parameters. For example, the inertial navigation system may include one or more movement, sensors, e.g., an accelerometer sensor and the like, to detect a movement of the mobile device and to provide movement, parameters corresponding to the movement of the mobile device, e.g., velocity and/or acceleration; and/or one or more orientation sensors, e.g., a gyroscope sensor and the like, to provide orientation parameters relating to the orientation of the mobile device.

The mobile device may determine the location of the device based on the parameters provided by the inertial navigation sensors. For example, the device may calculate a distance and a direction from a previous known location of the device based on the movement parameters and/or the orientation parameters.

The gyroscope may have errors, e.g., mechanical errors, calibration errors, and the like, which may affect the accuracy of one or more of the orientation parameters. The gyroscope errors may decrease an accuracy of the determined location of the mobile device.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIGS. 3A, 3B, 3C and 3D are schematic illustrations of a reference pattern, and three distorted patterns corresponding to the reference pattern, in accordance with some demonstrative embodiments.

DETAILED DESCRIPTION

Figure 1:
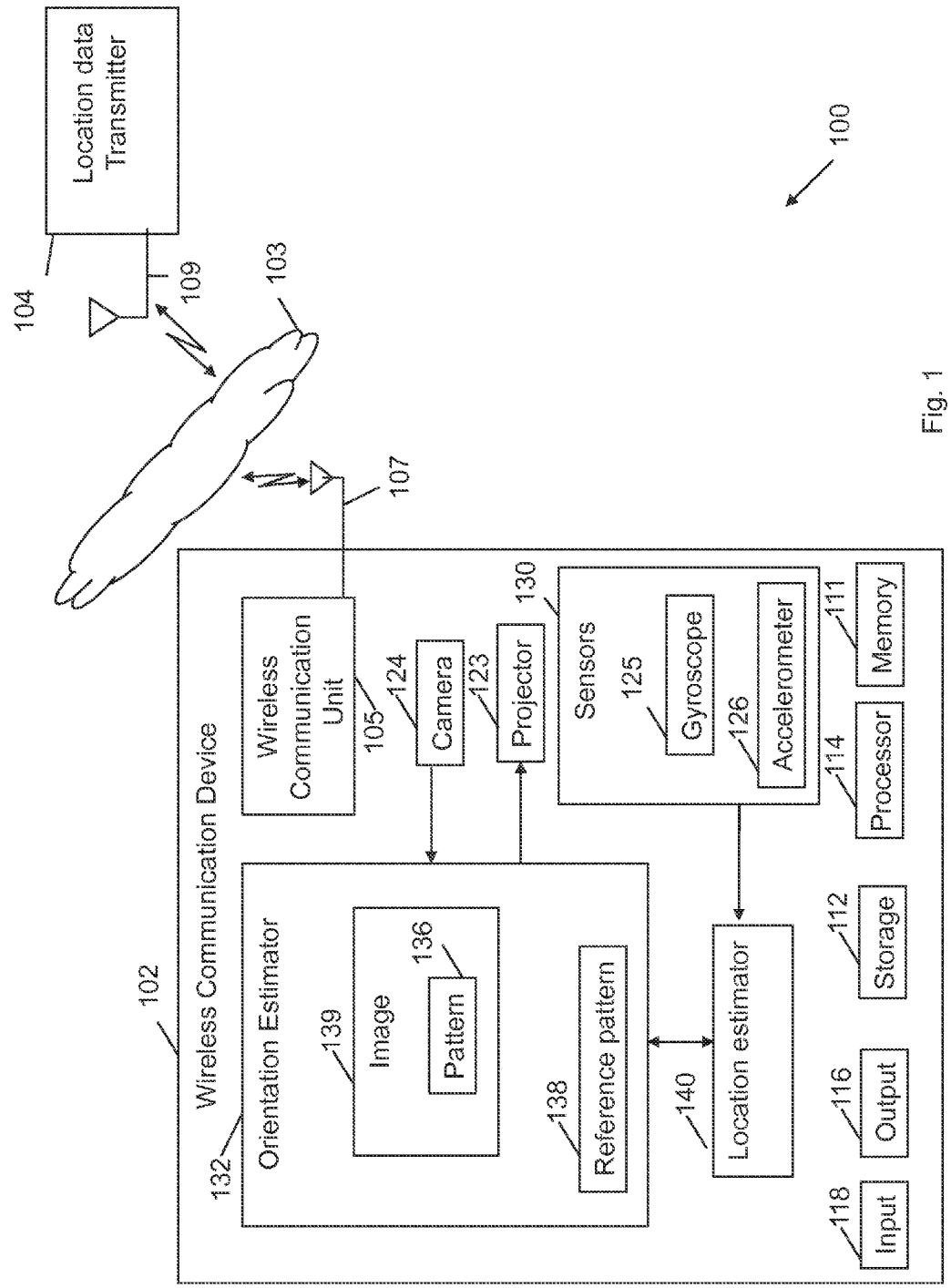
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein include, for example, "multiple" or "two or more". For example, "a plurality of items" includes two or more items.

Some embodiments may be used in conjunction with various devices and systems, for example, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a wired or wireless network, a wireless area network, a Wireless Video Area Network (WVAN), a Local Area Network (LAN), a Wireless LAN (WLAN), a Wireless Metropolitan Area Network (WMAN) communication system, a Personal Area Network (PAN), a Wireless PAN (WPAN), devices and/or networks operating in accordance with existing IEEE 802.11 standards ("the 802.11 standards"), e.g., including IEEE 802.11 (IEEE 802.11-2007: *Standard for Information technology—Telecommunications and information exchange between systems—Local and metropolitan area networks—Specific requirements, Part 11: Wireless LAN Medium Access Control (MAC) and Physical Layer (PHY) Specifications—June* 2007), 802.11n ("IEEE 802.11n-2009—*Amendment 5: Enhancements for Higher Throughput*. IEEE-SA. 29 October 2009"), 802.11ac ("*Very High Throughput <6 Ghz*"), 802.11 task group ad (TGad) ("*Very High Throughput 60 GHz*"), and/or future versions and/or derivatives thereof, devices, and/or networks operating in accordance with IEEE 802.16 standards ("the 802.16 standards"), e.g., including 802.16 (IEEE-Std 802.16, 2004 *Edition, Air Interface for Fixed Broadband Wireless Access Systems*), 802.16d, 802.16e (IEEE-Std 802.16e, 2005 *Edition, Physical and Medium Access Control Layers for Combined Fixed and Mobile Operation in Licensed Bands*), 802.16f, 802.16m standards and/or future versions and/or derivatives thereof, devices, and/or networks operating in accordance with existing Wireless-Gigabit-Alliance (WGA) and/or Wireless HD™ specifications and/or future versions and/or derivatives thereof, devices and/or networks operating in accordance with existing cellular specifications and/or protocols, e.g., 3rd Generation Partnership Project (3GPP), 3GPP Long Term Evolution (LTE), and/or future versions and/or derivatives thereof, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Global Navigation Satellite System (GNSS) device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, Bluetooth (BT) device, a Near Field Communication (NEC) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Global Navigation Satellite System (GNSS), Wi-Fi, Wi-Max, ZigBee™, Ultra-Wideband (UWB), Global System for Mobile communication (GSM), 2G, 2.5G, 3G, 3.5G, Enhanced Data rates for GSM Evolution (EDGE), Bluetooth (BT), Near Field Communication (NFC), or the like. Other embodiments may be used in various other devices, systems and/or networks.

The term "wireless device" as used herein includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may be used to provide a wireless service.

Reference is now made to FIG. 1, which schematically illustrates a block diagram of a system 100, in accordance with some demonstrative embodiments.

In some demonstrative embodiments, system 100 may include a wireless communication device 102 capable of communicating content, data, information and/or signals over one or more suitable wireless communication mediums 103.

In some demonstrative embodiments, wireless communication mediums 103 may include one or more unidirectional and/or single-directional wireless channels, for example, a Radio Frequency (RF) channel, a WiFi channel, a Bluetooth channel, a cellular channel, a GNSS Channel, an NFC channel, and the like.

In some demonstrative embodiments, wireless communication device 102 may include any suitable components for communicating, i.e., transmitting and/or receiving, wireless communication signals over wireless mediums 103. For example, device 102 may include a wireless communication unit 105 to communicate via one or more antennas 107.

In some demonstrative embodiments, antennas 107 may include any type of antennas suitable for transmitting and/or receiving wireless communication signals, Hocks, frames, transmission streams, packets, messages and/or data. Types of antennas that may be used for antennas 107 may include but are not limited to internal antenna, dipole antenna, omni-directional antenna, a monopole antenna, an end fed antenna, a circularly polarized antenna, a micro-strip antenna, a diversity antenna, a phase array antenna and the like. In some embodiments, antennas 107 may implement transmit and receive functionalities using separate transmit and receive antenna elements. In some embodiments, antennas 107 may implement transmit and receive functionalities using common and/or integrated transmit/receive elements.

In some demonstrative embodiments, device 102 may include, or may be included as part of a mobile or portable device, for example, a mobile computer, a laptop computer, a notebook computer, a tablet computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a cellular telephone, a PCS device, a PDA device which incorporates a wireless communication device, a mobile or portable GPS device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a BD player, a BD recorder, a DVD player, a HD DVD player, a DVD recorder, a HD DVD recorder, a PVR, a broadcast HD receiver, a video sink, an audio sink, a stereo tuner, a broadcast radio receiver, a flat panel display, a PMP, a DVC, a digital audio player, a speaker, an audio receiver, a gaming device, an audio amplifier, a data source, a data sink, a DSC, a media player, a Smartphone, a television, a music player, or the like.

In some demonstrative embodiments, device 102 may include, for example, one or more of a processor 114, an input unit 118, an output unit 116, a memory unit 111, and a storage unit 112. Device 102 may optionally include other suitable hardware components and/or software components. In some embodiments, some or all of the components of device 102 may be enclosed in a common housing or packaging, and may be interconnected or operably associated using one or more wired or wireless links.

Processor 114 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 114 executes instructions, for example, of an Operating System (OS) of wireless communication device 102, and/or of one or more suitable applications.

Input unit 118 includes, for example, a keyboard, a keypad, a mouse, a touch-pad, a track-ball, a stylus, a microphone, or other suitable pointing device or input device. Output unit 108 includes, for example, a monitor, a screen, a flat panel display, a Cathode Ray Tube (CRT) display unit, a Liquid Crystal Display (LCD) display unit, a plasma display unit, one or more audio speakers or earphones, or other suitable output devices.

Memory unit 111 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 112 includes, for example, a hard disk drive, a floppy disk drive, a Compact Disk (CD) drive, a CD-ROM drive, a DVD drive, or other suitable removable or non-removable storage units. Memory unit 111 and/or storage unit 112, for example, may store data processed by wireless communication device 102.

In some demonstrative embodiments, device 102 may be capable of receiving wireless communication signals including raw location data, e.g., over wireless mediums 103. For example, device 102 may receive GPS signals including the raw location data from one or more location data transmitters 104, e.g., one or more GPS satellites.

In some demonstrative embodiments, location data transmitters 104 may be configured to transmit wireless communication signals including the raw location data via one or more antennas 109. For example, location data transmitters 104 may include one or more location data origin transmitters, e.g., GNSS satellites to generate GNSS-based raw location data.

In some demonstrative embodiments, device 102 may include a location estimator 140 configured to estimate a location of device 102 based on the raw location data. For example, location estimator 140 may determine the location of device 102, by applying, for example, a triangulation method to the raw location data.

In some demonstrative embodiments, device 102 may include one or more sensors 130 configured to provide one or more location parameters relating to the location of device 102. Location estimator 140 may utilize the location parameters to estimate the location of device 102, e.g., in addition to or instead of the raw location data.

In one example, location estimator 140 may utilize the location parameters when the raw location data may not be accurate, e.g., when the received UPS signals are weak.

In another example, location estimator 140 may utilize the location parameters when device 102 may not be able to receive the GPS signals. For example, device 102 may be located at an indoor location, e.g., a building, a mall and the like, which may not enable device 102 to receive the GPS signals, e.g., the GPS signals may be blocked by, for example, walls, ceilings and the like. Accordingly, location estimator 140 may not be able to estimate the location of device 102 in an accurate manner.

In some demonstrative embodiments, sensors 130 may include a gyroscope sensor 125 and an accelerometer sensor 126 configured to provide the location parameters.

In some demonstrative embodiments, accelerometer 126 may provide to location estimator 140 movement parameters related to a movement of device 102. For example, the movement parameters may include acceleration parameters relating to an acceleration of device 102.

In some demonstrative embodiments, gyroscope 125 may provide to location estimator 140 gyroscope orientation parameters related to an orientation of device 102. For example, the gyroscope orientation parameters may include a yaw parameter relating to a yaw of device 102, a pitch parameter relating to a pitch of device 102 and a roll parameter relating to a roll of device 102.

In some demonstrative embodiments, location estimator 140 may determine the estimated location of device 102 based on the gyroscope orientation parameters, e.g., provided by gyroscope 125, and/or the movement parameters, e.g., provided by accelerometer 126. For example, location estimator 140 may calculate a velocity, position, acceleration and/or orientation of device 102 based on the movement parameters and the gyroscope orientation parameters.

Accordingly, location estimator 140 may determine the estimated location of device 102 based on the velocity and velocity direction of device 102. For example, location estimator 140 may calculate a current location of device 102 based on a calculated distance and a calculated direction with respect to a previous location of device 102, e.g., provided by the GPS signals or provided by a previous calculation of the estimated location of device 102.

In some demonstrative embodiments, gyroscope 125 may have a relatively low level of accuracy due to various gyroscope related errors, e.g., mechanical errors, calibration errors and the like. Accordingly, one or more of the gyroscope orientation parameters may not be accurate. For example, gyroscope 125 may have a drifting error, which may affect a pitch parameter provided by gyroscope 125 and may result in a pitch error relating to the pitch of device 102, which may increase over time.

In some demonstrative embodiments, the gyroscope related errors may cause a decrease of the accuracy of the estimated location of device 102.

In some demonstrative embodiment, device 102 may include an orientation estimator 132 configured to estimate an orientation of device 102, for example, independently of gyroscope 125, e.g., as described in detail below.

In some demonstrative embodiments, orientation estimator 132 may provide to location estimator 140 orientation parameters related to the orientation of device 102. For example, the orientation parameters may include a yaw of device 102, a pitch of device 102 and/or a roll of device 102. Location estimator 140 may correct the gyroscope related errors based on the orientation parameters, e.g., as described below.

In some demonstrative embodiments, orientation estimator 132 may detect a pattern 136 in at least one image 139 captured by device 102, and based on the detected pattern 136 and/or a comparison between the detected pattern 136 and a reference pattern 138, orientation estimator 138 may determine the orientation parameters, e.g. as described in detail below.

In some demonstrative embodiments, device 102 may include a camera 124 configured to capture image 139 from a field of view of camera 124. Camera 124 may include any suitable type of camera, for example, a built-in digital camera and the like.

In some demonstrative embodiments, reference pattern 138 may include at least one predefined geometric shape. For example, reference pattern 138 may include a symmetric geometric shape, e.g., a circle, a square and the like; an asymmetric geometric shape; and/or any other suitable geometric shape and/or pattern.

In some demonstrative embodiments, the geometric shape may include one or more reference geometric elements. For example, the reference geometric shape may include one or more lines, one or more angels, one or more curves and/or any other geometric elements.

In some demonstrative embodiments, detected pattern 136 may include a distortion of one or more of the reference geometric elements of reference pattern 138. For example, reference pattern 138 may include a circle, and detected pattern 136 may include a distortion of the circle, e.g., an ellipse.

In some demonstrative embodiments, orientation estimator 132 may determine the orientation of device 102 based on detected patter 136 and/or a comparison or predefined relationship between detected pattern 136 and reference pattern 138. For example, orientation estimator 138 may determine the orientation of device 102 based on the distortion of the predefined geometric shape. For Example, orientation estimator 138 may determine the orientation parameters based on a relationship between one or more distorted geometric elements of detected pattern 136, geometric elements of the ellipse, which correspond to one or more reference elements of reference pattern 138, e.g., the circle.

In some demonstrative embodiments, orientation estimator 132 may determine the orientation parameters by applying a predefined calculation to one or more geometric elements of detected pattern 136. The calculation may be based, for example, on a relationship between one or more geometric elements of the geometric shape included in reference pattern 138, and one or more corresponding geometric elements of the distorted geometric shape included in detected pattern 136.

In some demonstrative embodiments, orientation estimator 132 may determine the orientation parameters based on a comparison between one or more geometric elements of the geometric shape included in reference pattern 138, and one or more corresponding geometric elements of the distorted geometric shape included in detected pattern 136.

In some demonstrative embodiments, orientation estimator 132 may provide to location estimator 140 the calculated orientation parameters. Location estimator 140 may correct the gyroscope related errors and/or the estimated location of device 102, based on the orientation parameters.

In some demonstrative embodiments, orientation estimator 132 may repeat the estimation of the orientation of device 102 at a predefined time interval, e.g., to reduce power consumption of device 102. For example, orientation estimator 132 may repeat the estimation of orientation of device 102 every one second and the like.

In some demonstrative embodiments, orientation estimator 132 may repeat the estimation of the orientation of device 102 according to a predefined criterion, e.g., relating to device 102 and/or to gyroscope 125.

In one example, orientation estimator 132 may repeat the estimation of the orientation of device 102 according to a movement criterion related to a movement of device 102. For example, orientation estimator 132 may receive from gyroscope 125 and/or accelerometer 126 a movement indication of device 102. For example, orientation estimator 132 may repeat the estimation of the orientation of device, e.g., if the movement indication indicates a movement of device 102, which is greater than a predefined threshold, e.g., an acceleration change of more than five percent.

In another example, orientation estimator 132 may repeat the estimation of orientation of device 102 based on an error criterion related to an error of gyroscope 125. For example, orientation estimator 132 may repeat the estimation of orientation of device 102, e.g., when the gyroscope related errors are greater than a predefined threshold and/or when a rate of increase of the gyroscope related errors is greater than a predefined threshold. For example, orientation estimator 132 may repeat the estimation of orientation of device 102 when a pitch error increases over a predefined threshold, e.g., a pitch error of more than five percent.

In some demonstrative embodiments, orientation estimator 132 may improve orientation accuracy by enabling location estimator 132 to correct the gyroscope related errors, e.g., to prevent the gyroscope related errors from affecting the estimated location of device 102. Accordingly, orientation estimator 132 may improve an accuracy of the estimated location of device 102, e.g., when device 102 is located at an indoor location.

In some demonstrative embodiments, reference pattern 138 may be projected by device 102.

In some demonstrative embodiments, device 102 may include a projector 123 configured to project reference pattern 138 on any suitable surface, e.g., a floor, a carpet, a ceiling and the like.

In some demonstrative embodiments, projector 123 may include any suitable projector. For example, projector 123 may include a Light Electric Diode (LED) projector, a laser projector, a color projector and the like.

In some demonstrative embodiments, reference pattern 138 may include a plurality of reference pattern elements. For example, the reference pattern elements may include a plurality of predefined geometric shapes, e.g., a square, a circle, a rectangle, a kite and the like.

In some demonstrative embodiments, projector 123 may project reference pattern 138 including the reference pattern element, e.g., a predefined geometric shape, in the field of view of camera 124.

In some demonstrative embodiments, camera 124 may capture image 139 from the filed of view of camera 124.

In some demonstrative embodiments, orientation estimator 132 may detect pattern 136 in image 139. For example, orientation estimator 132 may detect a distorted geometric shape corresponding to the predefined geometric shape of reference pattern 138.

In some demonstrative embodiments, orientation estimator 132 may determine the orientation parameters of device 102 based on detected pattern 136. For example, orientation estimator 132 may determine the orientation parameters of device 102 based on the distorted geometric shape, e.g., as described below with reference to FIG. 2.

Figure 2:
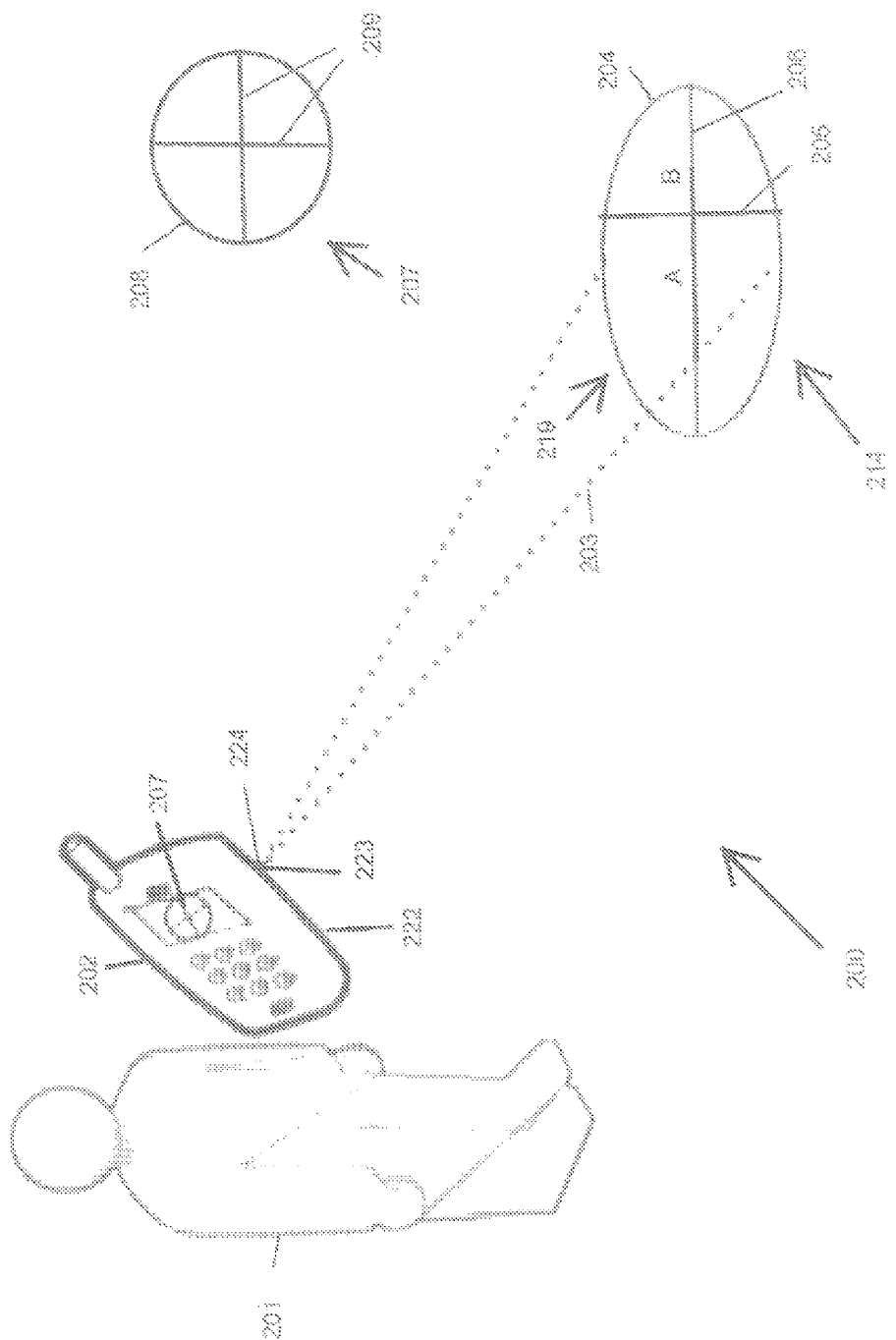
FIG. 2 is a schematic demonstration of an orientation estimation of a mobile device, in accordance with some demonstrative embodiments.

Reference is now made to FIG. 2, which schematically demonstrates an orientation estimation of a mobile device 202 being held by a user 201 of mobile device 202.

In some demonstrative embodiments, device 202 may perform the functionality of device 102 (FIG. 1).

In some demonstrative embodiments, device 202 may include an orientation estimator 222, a camera 223 and a projector 224.

In some demonstrative embodiments, orientation estimator 222 may perform the functionality of orientation estimator 132 (FIG. 1), camera 223 may perform the functionality of camera 124 (FIG. 1), and/or projector 224 may perform the functionality of projector 123 (FIG. 1).

In some demonstrative embodiments, orientation estimator 222 may include a reference pattern 207 including a predefined geometric shape, e.g., a circle 208 having two orthogonal diameters 209.

As shown in FIG. 2, device 202 may project, e.g., by projector 223, reference pattern 207 on a suitable surface, e.g., a floor, in a field of view 203 of camera 223.

In some demonstrative embodiments, device 202 may capture an image 219, e.g., by camera 221.

In some demonstrative embodiments, orientation estimator 222 may detect a pattern 214 in image 219.

As shown in FIG. 2, detected pattern 214 may include a distortion of reference pattern 207.

As shown in FIG. 2, detected pattern 214 may include a distortion of circle 208, e.g., an ellipse 204 having lines 205 and 206 corresponding to diameters 209.

In some demonstrative embodiments, orientation estimator 222 may determine the orientation parameters of device 202 based on detected pattern 205 and/or a relationship between and one or more geometric elements of detected pattern 205 corresponding to one or more reference geometric elements of reference pattern 207.

In some demonstrative embodiments, orientation estimator 222 may determine the orientation parameters of device 202 by applying a calculation to one or more elements of detected pattern 225. The calculation may be based, for example, on a relationship between diameters 209 and lines 203 and 206.

For example, orientation estimator 222 may calculate a distorted length ratio between a first segment, denoted A, of line 203 and a second segment, denoted B, of line 06. Orientation estimator 222 may determine the orientation parameters of device 202, for example, based on a relationship between the distorted length ratio and a known length ratio, e.g., a ratio of one, between the corresponding segments A and B of a corresponding diameter 209.

Reference is now made to FIG. 3A, which schematically illustrates a reference pattern 301, and FIGS. 3B, 3C and 3D, which schematically illustrate distorted patterns 302, 303 and 304, respectively, corresponding to reference pattern 301, in accordance with some demonstrative embodiments.

In some demonstrative embodiments, a device, e.g., device 102 (FIG. 1), detect a distorted pattern, e.g., distorted pattern 302, distorted pattern 303 or distorted pattern 304. For example, the device may project reference pattern 301 and detect the distorted pattern resulting from reference pattern 301, e.g., as described above.

In some demonstrative embodiments, distorted patterns 302, 303 and 304 may result from a change in a pitch angle and/or a change in a roll angle of the device. For example, distorted pattern 302 may result from a change in the pitch angle of the device, distorted pattern 303 may result from a change in the roll angle of the device, and distorted pattern 304 may result from a change in both the pitch and roll angles of the device.

In some demonstrative embodiments, the change in the pitch and/or roll angles of the device may be determined based on one geometric elements in the detected distorted pattern.

For example, orientation estimator 132 (FIG. 1) may determine the change in the pitch and/or roll angles of device 102 (FIG. 1) based on a relationship between measurements of four geometric elements, denoted A, B, C and D, e.g., as described below.

As shown in FIG. 3A, reference pattern 301 may include a square 311 including a first reference line 312 connecting between a center of a first side 315 of the square and a center of a second side 316 of the square, and a second reference line 313 connecting between a center of a third side 317 of the square and a center of a fourth side 318 of the square. Reference lines 312 and 313 may intersect at an intersection point 314.

As shown in FIG. 3A, the geometric element A may include a segment of reference line 312 between intersection point 314 and side 315, element B may include a segment of reference line 312 between intersection point 314 and side 316, element C may include a segment of reference line 313 between intersection point 314 and side 317, and element D may include a segment of reference line 313 between intersection point 314 and side 318.

In some demonstrative embodiments, a ratio between the lengths of elements A and B may be affected by the change in the pitch angle, and a ratio between the lengths of elements C and D may be affected by the change in the roll angle.

For example, as shown in FIG. 3A, the length of clement A is equal to the length of element B and, accordingly, a reference ratio between the lengths of elements A and B is one. As also shown n FIG. 3A, the length of element C is equal to the length of element C and, accordingly, a reference ratio between the lengths of elements C and D is one.

In some demonstrative embodiments, orientation estimator 132 (FIG. 1) may detect in the distorted pattern a distorted element, denoted A', corresponding to element A, a distorted clement, denoted b', corresponding to element B, a distorted element, denoted C', corresponding to element C, and/or a distorted element, denoted D' corresponding to element D.

For example, in distorted pattern 302, distorted element A' may include a line segment 321, distorted element B' may include a line segment 322, distorted element C' may include a line segment 323, and distorted element D' may include a line segment 324. As shown in FIG. 3B, a change in the pitch angle may result in a change in the ratio between distorted elements A' and B' e.g., while the ratio between elements C' and D' may remain unchanged.

In distorted pattern 303, distorted element A' may include a line segment 331, distorted element B' may include a line segment 332, distorted element C' may include a line segment 333, and distorted element D' may include a line segment 334. As shown in FIG. 3C, a change in the roll angle may result in a change in the ratio between distorted elements C' and D', e.g., while the ratio between elements A' and B' may remain unchanged.

In distorted pattern 304, distorted element A' may include a line segment 341, distorted element B' may include a line segment 342, distorted element C' may include a line segment 343, and distorted element D' may include a line segment 344. As shown in FIG. 3D, a change in both the pitch and roll angles may result in a change in the ratio between distorted elements A' and B', as well as a change in the ratio between elements C' and D'.

In some demonstrative embodiments, the change in the pitch angle and the roll angle of the device may be determined based on the ratio between distorted elements A' and B' and the ratio between the elements C' and D'. For example, orientation estimator 132 (FIG. 1) may determine the change in the pitch angle and/or roll angle of device 102 (FIG. 1) based on the ratio between distorted elements A' and B' and the ratio between the elements C' and D'.

In some demonstrative embodiments, the pitch angle, denoted $\theta_{Pitch}$, may be determined, for example, based on the ratio between the distorted elements A' and B', e.g., as follows:

$$\frac{A'}{B'} = \frac{\tan(\theta_{pitch}) - \tan(\theta_{pitch} - \alpha)}{\tan(\theta_{pitch} + \alpha) - \tan(\theta_{pitch})} \quad (1)$$

wherein α denotes a predefined reference pitch angle, e.g., corresponding to a projector of reference pattern 301, e.g., projector 123 (FIG. 1). For example, the reference pitch angle may be predefined based on a size of a light source of projector 123 (FIG. 1) and a vertical distance between the light source and a lens of projector 123 (FIG. 1).

In some demonstrative embodiments, the roll angle, denoted $\theta_{roll}$, may be determined, for example, based on the ratio between the distorted elements C' and D', e.g., as follows:

$$\frac{C'}{D'} = \frac{\tan(\theta_{roll}) - \tan(\theta_{roll} - \beta)}{\tan(\theta_{roll} + \beta) - \tan(\theta_{roll})} \quad (2)$$

wherein β denotes a predefined reference roll angle, e.g., corresponding to a projector of reference pattern 301, e.g., projector 123 (FIG. 1). For example, the reference roll angle may be predefined based on a size of a light source of projector 123 (FIG. 1) and a horizontal distance between the light source and a lens of projector 123 (FIG. 1).

Referring back to FIG. 1, in some demonstrative embodiments, device 102 may not be required to project reference pattern 138.

In some demonstrative embodiments, orientation estimator 132 may dynamically select reference pattern from a plurality of predefined pattern elements, according to one or more pattern elements of detected pattern 136. For example, orientation estimator 132 may select reference pattern 138 to include a circle if detected pattern 136 includes a distorted circle, e.g., an ellipse.

For example, the filed of view of camera 124 may include a plurality of floor tiles in a form of squares. Camera 124 may capture image 139 including a distorted image of the floor tiles, i.e., a distortion of the squares. Orientation estimator 132 may detect pattern 136 including a distorted square. Accordingly, orientation estimator 132 may select from the plurality of pattern elements a square element. Orientation estimator 132 may determine the orientation parameters based on one or more elements of detected pattern 136, e.g., the distorted square, corresponding to one or more elements of reference pattern 138, e.g., the square.

In some demonstrative embodiments, reference pattern 138 may include a pattern element detected by orientation estimator 132 in a previous image captured by device 102, e.g., as described below.

In some demonstrative embodiments, camera 124 may capture a first image from the field of view of camera 124.

In some demonstrative embodiments, orientation estimator 132 may detect a first pattern element in the first image captured by camera 124.

In some demonstrative embodiments, camera 124 may capture a second image, subsequent to the first image, from the field of view of camera 124 e.g., after a relatively short period of time.

In some demonstrative embodiments, orientation estimator 132 may detect a second pattern, e.g., pattern 136, in the second image captured by camera 124.

In some demonstrative embodiments, orientation estimator 132 may utilize the first pattern as reference pattern 138 and the second pattern as pattern 136.

In some demonstrative embodiments, orientation estimator 132 may determine the orientation of device 102 based on a comparison between pattern 136 detected in the second image and reference pattern 138 detected in the first image.

For example, camera 124 may capture a first image including a first distorted pattern of a square, e.g., a floor tile in the shape of a square. Orientation estimator 132 may detect the pattern of the square in the first image and may utilize the first distorted pattern as reference pattern 138. After a relatively short time, camera 124 may capture a second image, e.g., image 139, including a second distorted pattern of the square. Orientation estimator 132 may determine the orientation parameters based on a comparison between reference pattern 138, e.g., the first distorted square, and pattern 136, e.g., the second distorted square.

Figure 4:
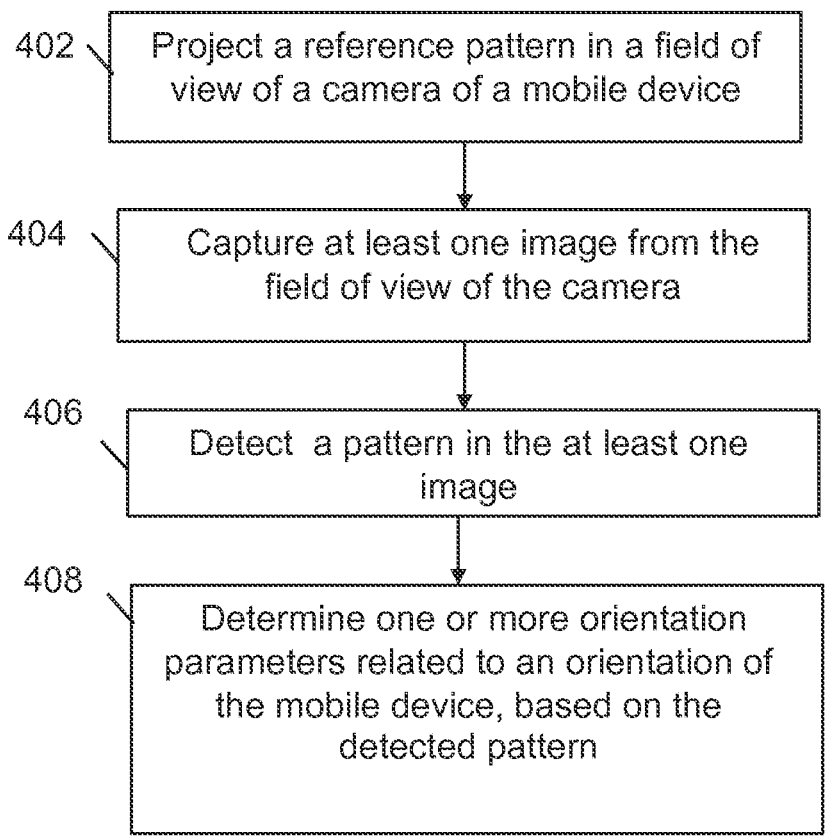
FIG. 4 is a schematic flow chart illustration of a method of estimating an orientation of a mobile device, in accordance with some demonstrative embodiments.

Reference is made to FIG. 4, which schematically illustrates a method of estimating an orientation of a mobile device, in accordance with some demonstrative embodiments. In some embodiments, one or more of the operations of the method of FIG. 4 may be performed by any suitable wireless communication system, e.g., system 100 (FIG. 1), wireless communication device, e.g., device 102 (FIG. 1) and/or device 202 (FIG. 2), and/or orientation estimator, e.g., orientation estimator 132 (FIG. 1) and/or orientation estimator 222 (FIG. 2).

As indicated at block 402, the method may include projecting a reference pattern in a field of view of a camera of a mobile device. For example, projector 123 (FIG. 1) may project reference pattern 138 (FIG. 1) in a field of view of camera 124 (FIG. 1) of device 102 (FIG. 1), e.g., as described above.

As indicated at block 404, the method may include capturing at least one image from the field of view of the camera. For example, camera 124 (FIG. 1) may capture image 139 (FIG. 1) from the filed of view of camera 124 (FIG. 1), as described above.

As indicated at block 406, the method may include detecting a pattern in the at least one image. For example, orientation estimator 132 (FIG. 1) may detect pattern 136 (FIG. 1) in image 139 (FIG. 1), e.g., as described above.

As indicated at block 408, the method may include determining one or more orientation parameters related to an orientation of the mobile device, based on one or more elements of the detected pattern. For example, orientation estimator 132 (FIG. 1) may determine the orientation parameters of device 102 (FIG. 1) based on detected pattern 136 (FIG. 1), e.g., as described above.

Figure 5:
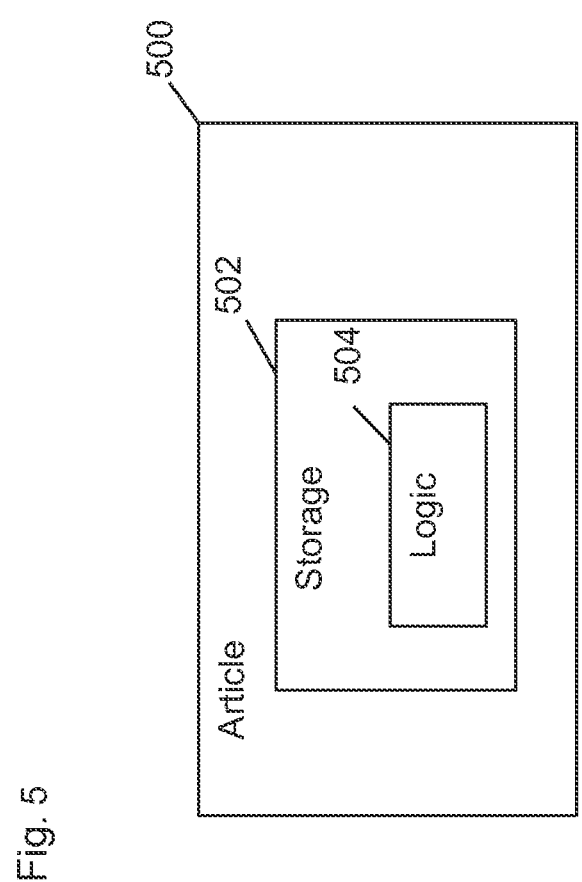
FIG. 5 is a schematic illustration of an article of manufacture, in accordance with some demonstrative embodiments.

Reference is made to FIG. 5, which schematically illustrates an article of manufacture 500, in accordance with some demonstrative embodiments. Article 500 may include a non-transitory machine-readable storage medium 502 to store logic 504, which may be used, for example, to perform at least part of the functionality of orientation estimator 132 (FIG. 1) and/or to perform one or more operations of the method of FIG. 3. The phrase "non-transitory machine-readable medium" is directed to include all computer-readable media, with the sole exception being a transitory propagating signal.

In some demonstrative embodiments, article 500 and/or machine-readable storage medium 502 may include one or more types of computer-readable storage media capable of storing data, including volatile memory, non-volatile memory, removable or non-removable memory, erasable or non-erasable memory, writeable or re-writeable memory, and the like. For example, machine-readable storage medium 502 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 504 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 504 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Functions, operations, components and/or features described herein with reference to one or more embodiments, may be combined with or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A device comprising:
an orientation estimator component configured to detect a pattern in at least one image captured by a mobile device, to select a reference pattern from a plurality of predefined reference patterns based on a shape of the detected pattern, to detect one or more geometric elements in the detected pattern, which correspond to one or more geometric elements of the reference pattern, and based on the one or more geometric elements in the detected pattern, to determine one or more estimated orientation parameters related to an orientation of said mobile device, the orientation estimator component is configured to determine the one or more estimated orientation parameters based on a comparison between a first geometric shape of the one or more geometric elements in the detected pattern and a second geometric shape of the one or more geometric elements of the reference pattern; and
a location estimator component configured to process one or more gyroscope orientation parameters from a gyroscope, said location estimator component configured to correct one or more orientation errors of said gyroscope based on said estimated orientation parameters.

2. The device of claim 1 comprising:
a camera to capture said image from a field of view of said camera.

3. The device of claim 1, wherein said reference pattern comprises at least one predefined geometric shape.

4. The device of claim 1, wherein the first geometric shape comprises a distortion of the second geometric shape, and wherein said orientation estimator component is to determine said estimated orientation parameters based on a relationship between two or more distorted geometric elements of said first geometric shape.

5. The device of claim 1, wherein said orientation estimator component is to determine said estimated orientation parameters by determining at least one estimated orientation parameter selected from a group consisting of a yaw of said mobile device, a pitch of said mobile device and a roll of said mobile device.

6. The device of claim 1, wherein said reference pattern comprises a pattern detected in a previous image captured by said device.

7. The device of claim 1 comprising said gyroscope.

8. A method comprising:
detecting a pattern in at least one image captured by a mobile device;
selecting a reference pattern from a plurality of predefined reference patterns based on a shape of the detected pattern, the detected pattern including one or more distorted geometric elements corresponding to one or more reference geometric elements of the reference pattern;
based on a comparison between a first geometric shape of the one or more distorted geometric elements in the detected pattern and a second geometric shape of the one or more reference geometric elements of the reference pattern, determining one or more orientation parameters related to an orientation of said mobile device; and
correcting one or more orientation errors of a gyroscope based on said orientation parameters.

9. The method of claim 8 comprising:
capturing said image from a predefined field of view.

10. The method of claim 8, wherein said reference pattern comprises at least one predefined geometric shape.

11. The method of claim 8, wherein the first geometric shape comprises a distortion of said second geometric shape, and wherein determining said orientation parameters comprises determining said orientation parameters based on a relationship between two or more distorted geometric elements of said first geometric shape.

12. The method of claim 8, wherein determining said orientation parameters comprises determining said orientation parameters by determining at least one orientation parameter selected from a group consisting of a yaw of said mobile device, a pitch of said mobile device and a roll of said mobile device.

13. The method of claim 8, wherein said reference pattern comprises a pattern detected in a previous image captured by said device.

14. A system comprising:
 at least one mobile device including:
  a gyroscope to provide one or more gyroscope orientation parameters;
  a camera to capture an image from a field of view of said camera;
  a projector to project a reference pattern in the field of view of said camera; and
  at least one orientation estimator to detect a pattern corresponding to said reference pattern in said image, and based on a relationship between two or more geometric elements of a first geometric shape in said detected pattern, to determine one or more estimated orientation parameters related to an orientation of said mobile device, the first geometric shape comprising a distortion of a second geometric shape in the reference pattern, said orientation estimator to determine said estimated orientation parameters based at least on a ratio between a size of a first geometric element of said two or more geometric elements and a size of a second geometric element of said two or more geometric elements, said mobile device is configured to correct one or more orientation errors of said gyroscope based on said estimated orientation parameters.

15. The system of claim 14, wherein said orientation estimator is to determine said estimated orientation parameters by determining at least one estimated orientation parameter selected from a group consisting of a yaw of said mobile device, a pitch of said mobile device and a roll of said mobile device.

16. The system of claim 14, wherein said reference pattern comprises a pattern detected in a previous image captured by said camera.

17. The system of claim 14, wherein said projector comprises at least one projector selected from a group consisting of a Light Electric Diode (LED) projector, a laser projector, and a color projector.

18. A product including a non-transitory storage medium having stored thereon instructions that, when executed by a machine, result in:
 detecting a pattern in at least one image captured by a mobile device;
 selecting a reference pattern from a plurality of predefined reference patterns based on a shape of the detected pattern;
 based on a comparison between a first geometric shape of one or more geometric elements in the detected pattern and a second geometric shape of one or more reference geometric elements of the reference pattern, determining one or more orientation parameters related to an orientation of said mobile device; and
 correcting one or more orientation errors of a gyroscope based on said orientation parameters.

19. The product of claim 18, wherein the first geometric shape comprises one or more distorted geometric elements corresponding to the second geometric shape, and wherein determining the one or more orientation parameters comprises determining the one or more orientation parameters based on the one or more distorted geometric elements.

20. The product of claim 19, wherein determining said orientation parameters comprises determining said orientation parameters based on a relationship between two or more of said distorted geometric elements.

21. The product of claim 18, wherein determining said orientation parameters comprises determining said orientation parameters by determining at least one orientation parameter selected from a group consisting of a yaw of said mobile device, a pitch of said mobile device and a roll of said mobile device.

22. The product of claim 18, wherein said reference pattern comprises a pattern detected in a previous image captured by said device.

23. The product of claim 18, wherein said instructions result in:
 capturing said image from a predefined field of view.

* * * * *